UNITED STATES PATENT OFFICE.

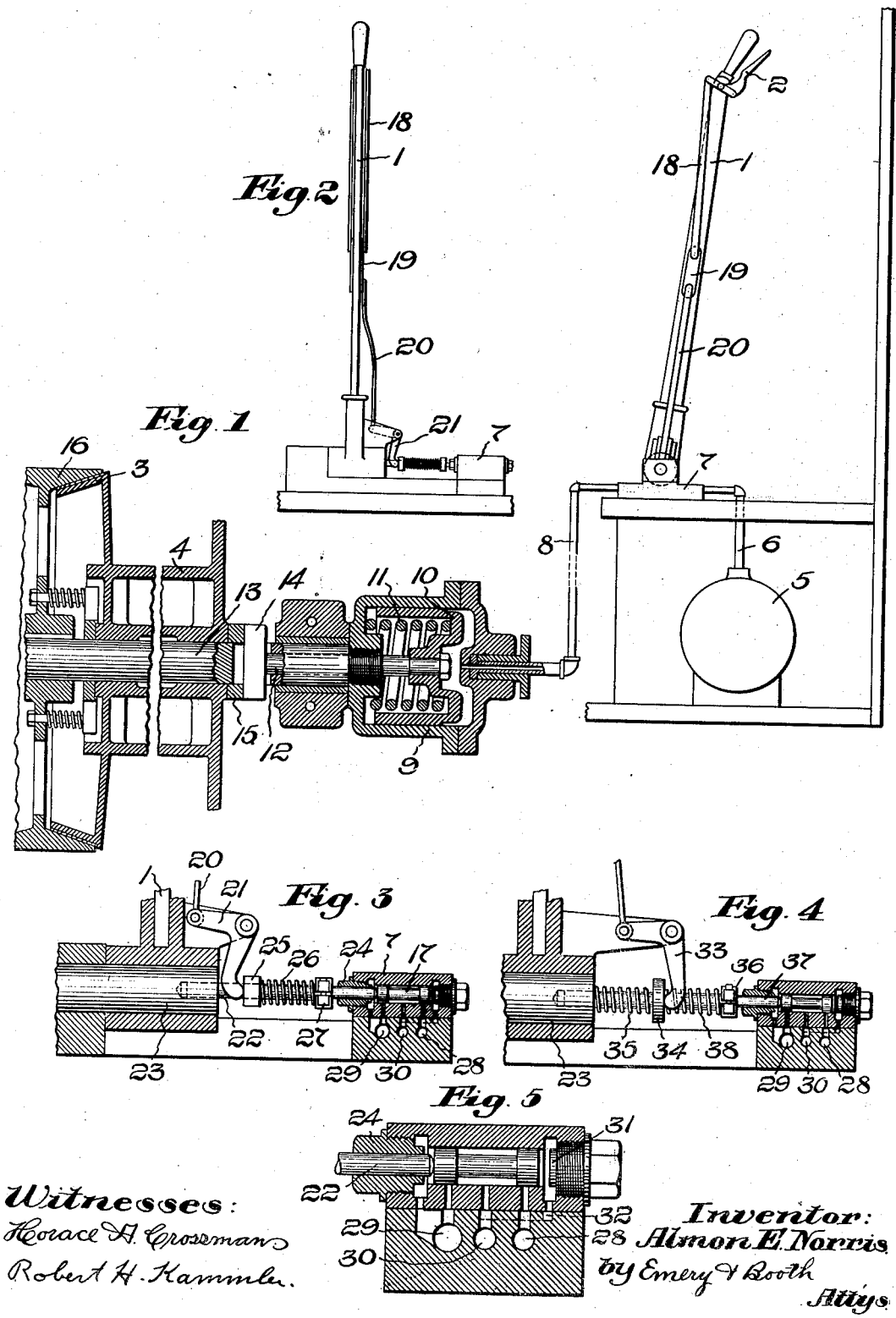
A. E. NORRIS.
CONTROLLING DEVICE.
APPLICATION FILED MAY 6, 1908.
1,088,293. Patented Feb. 24, 1914.

ALMON E. NORRIS, OF CAMBRIDGE, MASSACHUSETTS.

CONTROLLING DEVICE.

1,088,293.  Specification of Letters Patent.  Patented Feb. 24, 1914.

Application filed May 6, 1908. Serial No. 431,160.

*To all whom it may concern:*

Be it known that I, ALMON E. NORRIS, a resident of Cambridge, county of Middlesex, and State of Massachusetts, have invented an Improvement in Controlling Devices, of which the following description, in connection with the accompanying drawings, is a specification, like letters on the drawings representing like parts.

My invention relates to controlling devices, being more particularly concerned with the provision of means for effectively controlling the application of auxiliary power, such, for example, as compressed air or other pressure fluid, to the operation of apparatus where the application of such power is required to be had with the precision and delicacy resembling that where hand power is relied upon.

As an illustrative example there may be cited the case of a friction clutch for a rope-winding drum. In such instance it is quite desirable that the auxiliary power which is applied for engaging or releasing the clutch should be applied by the operator with substantially the same graduated and delicate effect as where hand power alone is relied upon to operate such a device. For example, where a grab is raised or lowered through a rope-winding drum, the clutch for such drum, when operated by manual power, is not only completely engaged or completely disengaged at times, but also at other times partly thrown in so that the operator has the graduated control of such clutch constantly at his command. During the lowering of the load he can permit more or less slippage and, through the resultant retarding friction, maintain at any desired rate the speed at which the load drops. The same is true of the traversing of the trolley which sustains the grab and which, by regulating the speed of its inhaul rope, can be run in or out at different speeds. In other words, in the practical operation of devices of this class not only must the operator have the auxiliary power at his command to render the clutch or other controlling device entirely operative or inoperative, but it is also necessary that he should be able to apply the auxiliary power to secure and maintain intermediate conditions and cause the controlling device to respond proportionately either to the manual movement of the controlling lever or other instrument, or to the pressure manually exerted, as in the case of directly applied manual control. Where compressed air is employed for this purpose, and a simple controlling valve only is used, the opening of such valve applies the full pressure to render the clutch or other device completely effective. The only way a condition can be secured between an inoperative and a completely operative or effective one is to reduce or build up the pressure in the system by intermittently opening the valve to the exhaust or the live pressure. To do this the valve lever must be quickly oscillated from an open to a closed position, since in neither position does it give the required effect. This neither simulates the conditions of hand control, since the operator is called upon to jerk back and forth the hand lever which offers no resistance to movement as contrasted with moving the usual clutch controlling lever part way against a constantly increasing pressure, nor is the effect the same since the clutch or other controlling device is alternately thrown in and out, exerting a series of jerks upon the rope instead of an even pull.

One object of the present invention is to provide an economical and practical system of auxiliary power control for devices of this and other types, which system shall be practically applicable to hoisting and conveying apparatus, as well as other apparatus and instrumentalities, and where substantially the same delicacy of control may be obtained as with direct hand control.

In the following described embodiment of the invention the same is shown as employing compressed air and as applied to the actuation of the clutch for a rope-winding drum, but it is to be understood that the actual medium of power employed and the actual form of apparatus to which the same is shown applied form no essential part of my broad invention.

My invention will be best understood by reference to the following description when taken in connection with the accompanying illustration of one specific embodiment thereof, while its scope will be more particularly pointed out in the appended claims.

In the drawings: Figure 1 shows a side elevation of a controlling lever to which is applied one embodiment of my invention, the same also being shown as operatively associated with the clutch of a rope-winding drum; Fig. 2 is a rear elevation of the lever and the adjacent valve casing shown in Fig. 1; Fig. 3 is a longitudinal section in elevation taken through the axis of one of the controlling levers shown in Fig. 1 and also showing the construction of the clutch-controlling valve; Fig. 4 is a similar section showing modified valve connections; and Fig. 5 is a longitudinal section taken through the valve shown in Figs. 3 and 4, but on a larger scale.

Referring to the drawings and to the embodiment of my invention there selected for illustrative purposes, I have there shown a hand lever 1 of the type employed for controlling the friction of a hoisting drum, the connections of the lever for controlling the drum friction being omitted. Adjacent the handle of the lever 1 there is provided a controlling member 2, herein in the form of a pivoted hand latch or grip, the latter adapted to move a valve of special construction for controlling the application of compressed air or other pressure fluid to the clutch 3 of the rope-winding drum 4. The particular form of controlling device employed and the particular form of the part or parts upon which it is mounted or with which it is associated is not material to my invention, but I have here shown the particular parts referred to for the sake of illustration.

Compressed air may be supplied from a main or any other suitable source of supply, the same being herein conventionally indicated by the storage tank 5 connected by the pipe 6 with the valve casing 7 whence, under the control of the valve therein, the same passes through the supply pipe 8 to the pressure cylinder 9 which is secured in axial alinement with the rope-winding drum 4, the latter being located at any desired distance from the controlling valve and lever. Within the cylinder 9 is the piston 10 constantly pressed toward the inlet end of the cylinder by the coiled spring 11, and rigidly attached to the axial rod 12 which is slidably mounted within the driving shaft 13. The end of the rod is secured to a cross-key or pin 14 and, working in a transverse slot in the shaft, bears against a collar 15, the latter abutting against the end of the drum 4. When the piston 10 is forced inwardly the rod and pin move the drum 4 along the shaft and force the movable cone-shaped clutch member attached to the end of the drum into frictional engagement with the fixed clutch member 16, thereby communicating driving movement from the driving shaft 13 to the rope-winding drum 4.

The construction of the clutch referred to is well-known in the art and description is here given merely to illustrate one specific application of my invention.

The opening of the clutch cylinder 9 to the main supply pipe 6 is effected by a valve 17, herein of the piston type, in the valve chamber 7. To control this valve the hand grip is connected by a link 18 with the sliding block 19, and the latter is connected by a link 20 to one arm of a bell-crank lever 21 pivoted in a bracket on the hub of the lever 1 (Fig. 3). The opposite arm of the bell-crank lever is forked and embraces a sliding actuating pin 22, the latter being mounted for sliding movement at one end in the lever shaft 23, or any other suitable support, and, at the opposite end, in the plug 24. The lever 21 abuts against a collar 25 slidably mounted upon the pin 22 and adapted to effect movement thereof through the coil spring 26 interposed between the said sliding collar and the fixed collar or abutment 27 clamped about said pin.

When the valve 17 is opened to admit pressure fluid to the clutch cylinder, the pressure tends to throw the clutch fully on. I have so constructed the valve, however, that the pressure admitted to the cylinder is automatically regulated and maintained proportionately to the manual pressure applied to the hand grip.

Referring to Figs. 3, 4 and 5, the valve casing has a live pressure port 28 connected with the main supply pipe 6, an exhaust port 29 opening into the atmosphere, and an intermediate port 30 connected with the supply pipe 8 leading to the clutch cylinder 9. The valve is adapted to be moved longitudinally to place the cylinder port 30 in communication with either the pressure or the exhaust port, excessive movement in one direction being limited by the abutment 31 threaded into the end of the valve chamber and in the other direction by the abutting plug 24. The valve is moved in one direction by the actuating pin 22, the pin-actuating movement of the valve, as will be more fully set forth, taking place against pressure fluid resistance upon the opposite end of the valve, such resistance being proportional to the working pressure admitted to the working or clutch cylinder.

When the hand grip 2 is compressed the connections are moved to slide the collar 25 along the pin and compress the spring 26. The compression of the spring 26, in turn, moves the pin 22 against the piston valve and moves the latter to open the working cylinder port to the live pressure port 28, thereby admitting pressure to the working cylinder 9 and applying the clutch.

If the hand grip is squeezed tightly against the handle of the lever, the spring 26 may be compressed under such a pressure that the valve will move against the abutment 31 and open and maintain open the working cylinder so that it will attain the full pressure of air supply. The working cylinder port 30, however, is connected with the space at the outer end of the valve chamber by a a run-around port 32, shown in dotted lines in Figs. 3 to 5, so that the outer end or area of the valve is exposed to the same pressure as is admitted to the working cylinder and this pressure, if sufficient to overcome the pressure exerted by the spring 26, will move the valve to a closed position, or even beyond that to a position of exhaust, thereby to hold constant or reduce the pressure in the working cylinder. If, therefore, the hand grip is only partly closed, the spring 26 will be only partly compressed and the air pressure exerted upon the opposite end of the valve will move to close the same before the full pressure of air supply has been attained in the working cylinder. The proportions of the valve-controlling spring 26 and the area of the end of the valve exposed to the air pressure admitted through the run-around port 32 are preferably so selected that when the hand grip is moved part way, thereby exerting pressure against the spring and opening the valve, the latter will be closed by the pressure simultaneously admitted through the port 32 as soon as that pressure is built up to a point proportional to the hand pressure exerted upon the hand grip. On the other hand, the valve will again be immediately opened to admit more pressure fluid if the pressure drops below the point which is called for by the position of the lever and the degree of compression of the spring. The result is that the regulating cylinder on the one side and the spring 26 on the other will automatically control the valve to maintain the pressure in the supply pipe 8 at the predetermined point, the spring acting to open the valve when the pressure in the pipe for any reason drops below the predetermined point and the air pressure at the end of the valve acting to close the valve or to move it beyond that point and to a position of exhaust, if the pressure for any reason rises above that predetermined point.

The various parts may be so proportioned that the valve will respond sensitively to the position of the controlling lever and admit and maintain a predetermined pressure supply in the pipe. Such pressure will be proportionate to the pressure exerted against the spring 26 and the operator will, therefore, exert his strength against the hand grip with a force which, at all times, will be substantially proportionate to, although it may be considerably less than the actual pressure in the operating cylinder 9 at the clutch. In other words, his control over the clutch is exercised in simulation of the conditions which would obtain if the latter were connected by mechanical connections to the hand grip 2 or other clutch controlling lever.

It will be obvious that my invention is applicable not only to the movement of a friction clutch member such as the member 3, but to the movement also of any other controlling element, or any other member continued movement of which, like the continued movement of said clutch member, is accompanied by an increasing opposing resistance.

In Fig. 4 I have shown a modified form of controlling and regulating device of the same general type as that illustrated in Fig. 3, being applicable, however, to cases where the auxiliary power is normally maintained applied to hold the clutch or other controlling element in one position and then withdrawn at times through manual movement of the controlling lever to release the controlling element and permit its movement to another position under the influence of some medium such as a spring. Such would be the case were the spring 11 in the clutch cylinder 9 employed to apply instead of release the clutch member 3 and the cylinder 9 normally maintained open to pressure fluid to oppose the spring and thereby release instead of apply the clutch member, the exhaustion of the pressure fluid from the cylinder under the control of the operator then acting to permit the spring-actuated application of the clutch. Under such circumstances a bell-crank lever 33 (Fig. 4) may be employed of the form there shown. This acts against the sliding collar 34 and the spring 35, the latter between such collar and the stud or shaft 23. Between the sliding collar 34 and the fixed or clamped collar 36, the latter fixed upon the operating pin 37, is a second and weaker spring 38.

Substantially the same construction of valve and valve chamber is shown as in the case of the first described modification in Fig. 3, but in the modified form of Fig. 4 the normal condition which accompanies the release or inactive position of the hand latch 2 being that of pressure within the clutch cylinder 9 and the run-around port 32, the spring 38 is normally or initially compressed so that with the hand grip released it balances the pressure which is exerted against the opposite end of the valve when the full working pressure of the supply source is attained in the working cylinder. With the hand grip released, therefore, the working cylinder is filled with pressure and the valve is balanced as shown with both exhaust and supply ports closed, but adapted to be moved to open one or the other the instant the fluid exerted pressure upon the valve falls below that of the spring or vice versa.

The pressure in the working cylinder is exhausted or reduced by allowing the spring 38 to expand and thereby reduce the spring exerted pressure upon the valve. The expansion of the spring 38 follows the compression of the hand grip, for the latter act compresses the spring 35 and slides the abutting collar 34 farther away from the fixed collar 36. The spring 35 may be initially compressed to the same degree as the spring 38, or it may be compressed to a greater degree if a stop or like provision is employed to limit its compressive effect upon the spring 38 to the required amount when the hand grip is full open.

It will be seen that the principle of operation is substantially the same in the last described modification, although the parts operate in a somewhat reverse relation. In other words, the valve being constantly pressed toward an open position by spring pressure, and against the opposing air pressure, the spring pressure is relieved more or less by the movement of the hand grip and pressure in the cylinder is more or less reduced by the automatc regulation according to the pressure exerted upon the hand grip. In each case, however, the auxiliary power may be applied to the controlled parts gradually and delicately responsive to the graduated control exercised by the operator over his immediate controlling lever. In each case the controlled part is moved under a force or pressure which is proportionate to the pressure exerted by the operator against the controlling lever or other device which he holds, and also proportionate to the movement of such controlling device.

While the principles of my invention may be carried out in a great variety of ways and combinations, the adjustment for the valve 17 is preferably such that it normally remains in a balanced state, closing both the supply and exhaust ports and opening only for an instant as the spring-exerted pressure exceeds the fluid-exerted pressure or vice versa. In the one case it opens the supply port and moves back to close the same, quickly at first and then slowly, as the admitted pressure approaches the point determined by the pressure manually applied to the controlling lever. When that pressure is reached both ports are again closed and the valve again finds its balanced condition. In the other case, where the fluid-exerted pressure exceeds the spring-exerted pressure owing to a manually-caused reduction in the latter at the hand controlling lever, the valve moves to open the exhaust and then is gradually restored to its balanced position as the pressure drops to the point determined by the hand control. In practice, the valve responds almost instantaneously to the movement of the hand grip and is almost instantaneously restored to its balanced condition so that the working pressure is quickly and delicately responsive to rapid successive movements of the hand controlling lever.

In the drawings a conventional showing only is made as to actual and relative dimensions and proportions of the valves, pipes, springs, levers, etc., these details obviously being a matter of design well understood by those skilled in the art and a matter of special consideration for any given installation, dependent in each case upon the pressure employed and numerous other considerations with which an explanation of the broad principles of my invention need not be encumbered.

While the controlling valve may be actuated by any suitable form of controlling device, my invention as described permits it to be associated in the form shown or in other forms, with a controlling lever such as the controlling lever 1 which, at the same time, may be used to perform some other controlling function, such as the control of the clutch for another rope-winding drum, each without interfering in the least with the function of the other. It will be seen that the valve 17 is arranged co-axially with the lever 1, so that the latter may be moved forward and back without affecting the operation of the valve.

While I have shown and described one form of my invention, it is to be understood that the same is not limited to the details of parts herein shown, or to the specific application of the invention herein described, but that extensive modifications may be made therein without departing from the spirit of the invention.

Having thus described my invention, what I claim is:

1. The combination with an element adapted to be moved, of pressure fluid means for moving the same, a source of pressure fluid supply, movable controlling means within the control of the operator for regulating communication between the pressure fluid means and the source of supply, and means for maintaining the pressure admitted to the pressure fluid means at a point proportionate to the effort exerted by the operator against the controlling means.

2. The combination with a controlling element of pressure fluid means for applying the same, a source of pressure fluid supply, controlling means under the control of the operator, a supply valve and means automatically controlling the valve in response and proportionate to the effort exerted by the operator at the controlling means.

3. The combination with an element adapted to be moved against an increasing resistance, of pressure fluid means for moving the same, a source of pressure fluid supply, movable controlling means within the control of the operator for regulating communication between the pressure fluid means and the source of supply, resistance means presenting an increased resistance to the movement of said controlling means and pressure governing means responsive to the force exerted by the operator in moving the controlling means thereby to secure and maintain an effective fluid pressure proportionate to the effort exerted by the operator.

4. The combination with an element adapted to be moved, pressure fluid means for moving the same, a source of pressure fluid supply, means within the control of the operator for controlling the supply to and exhaust from said pressure fluid means, and pressure maintaining means regulating both the supply and exhaust for maintaining a pressure determined by the effort exerted by the operator at said controlling means.

5. The combination with a controlling element adapted to be moved from one position to another position with an increasing resistance, of controlling means for applying the same, a source of power, power-actuated means through which said controlling means acts in applying said controlling element and power regulating means interposing an increasing resistance to the controlling movement by the operator of the controlling means as the latter is moved to a position for applying increased power to the controlling element, for maintaining automatically the amount of power applied to said power-actuated means proportional to the effect exerted by the operator in moving the controlling means.

6. The combination with a controlling element having a graduated movement from one position to another, controlling means for applying the same, a source of power, power-actuated means through which said controlling means acts in applying said controlling element, said controlling means in controlling said power also having a graduated movement and means, including a yielding element opposing the movement of the controlling means, for regulating automatically the amount of power applied to said power actuated means to maintain its effective action upon the controlling element proportional to the graduated movement of the controlling means.

7. The combination with an element adapted to be moved against an increasing resistance, pressure fluid means for moving the same, a source of pressure fluid supply, movable means within the control of the operator for regulating communication between the pressure fluid means and the source of supply, resistance means against which said controlling means moves with an increasing resistance said resistance being effective in proportion to the force exerted by the operator for moving the controlling means to restrict or enlarge such communication thereby to maintain an effective fluid pressure proportional to the effort exerted by the operator.

8. The combination with an element adapted to be moved by pressure fluid of pressure fluid means for moving the same, a valve for controlling the pressure fluid supply, a controlling lever for moving said valve, a spring interposed between said lever and said valve and opposing movement of the latter by the former, and means effective in proportion to the pressure fluid admitted to said pressure fluid means for moving said valve in the opposite direction.

9. The combination with an element adapted to be moved by pressure fluid, pressure fluid means for moving the same, a source of pressure fluid supply, a valve controlling the same, an actuating member for moving the valve in one direction, said valve having a pressure area to which pressure is admitted for moving the valve in the opposite direction, an actuating lever for moving said member, a spring interposed between said lever and said member, and means for admitting to the pressure area of the valve pressure proportionate to the pressure admitted to said pressure fluid moving means.

10. The combination with an element adapted to be moved, presure fluid means for moving the same, a source of pressure fluid supply, a hand lever, a valve for controlling the pressure fluid arranged to slide in line with the axis of said hand lever, a valve-controlling device upon said hand lever, and means for moving the valve independently of the movement of the lever to cause the same to maintain pressure upon said moving means automatically at a point determined by the valve-controlling means.

11. In a power transmission system the combination with a friction member adapted to be moved and a pressure actuated piston 10 and its cylinder 9, the controlling valve 17 carrying an area exposed to the pressure-fluid admitted to the cylinder, the controlling device 2 and the spring 26 between the controlling device and valve.

12. The combination with an element adapted to be moved against an increasing resistance of pressure-fluid means for moving the same, a source of pressure-fluid supply a valve for controlling admission of pressure-fluid from said source of supply to said pressure-fluid means, a controlling device and a connecting spring between said valve and controlling device for moving the former in response to the movement of the latter, said valve carrying a pressure area against which pressure fluid is adapted to be admitted from the pressure-fluid means to move said valve in opposition to the movement imparted by said spring.

13. The combination with an element adapted to be moved by pressure fluid, of means for moving the same, a valve controlling the pressure fluid means, a valve moving member, a yielding connection between the valve and said member, and means for moving the valve independently of said member with a force proportionate to the pressure admitted to the pressure fluid means.

14. The combination with an element adapted to be moved, of pressure fluid means for moving the same, a valve for controlling the pressure fluid means, a valve controlling member, means for causing the valve to be moved in one direction with an effort proportionate to the pressure admitted to the pressure fluid means and means for causing it to be moved in the opposite direction with an effort varying with the effort exerted by the operator at the controlling means.

15. A controlling valve for fluid pressure operated devices comprising in combination, a valve chamber having a closed end; an admission port formed in said chamber; an exhaust port formed in said chamber; a third port formed in said chamber and adapted to be connected to the controlled device; a valve member slidable in said chamber and fitting closely to the walls thereof, said valve connecting said third port with said admission port when in one position and the said third port with said exhaust port when in another position; a by pass adapted to establish communication between said third port and the space at the closed end of said valve chamber; and means for applying a variable opposition to the motion of said valve member.

16. A controlling valve for fluid pressure operated devices comprising in combination, a valve chamber having a closed end; an admission port formed in said chamber; an exhaust port formed in said chamber; a third port formed in said chamber and adapted to be connected to the controlled device; a valve member slidable in said chamber and fitting closely to the walls thereof, said valve connecting said third port with said admission port when in one position and the said third port with said exhaust port when in another position; a by pass adapted to establish communication between said third port and the space at the closed end of said valve chamber, a spring opposing the motion of said valve member; and means for varying the stress on said spring.

In testimony whereof, I have signed my name to this specification, in the presence of two subscribing witnesses.

A. E. NORRIS.

Witnesses:
ROBERT H. KAMMLEE,
EVERETT S. EMERY.